United States Patent [19]
Goddard et al.

[11] Patent Number: 5,964,064
[45] Date of Patent: Oct. 12, 1999

[54] THEATER WITH MULTIPLE SCREEN THREE DIMENSIONAL FILM PROJECTION SYSTEM

[75] Inventors: Gary Goddard, North Hollywood; Adam Bezark, Glendale, both of Calif.

[73] Assignee: Universal City Studios, Inc., Universal City, Calif.

[21] Appl. No.: 08/845,662

[22] Filed: Apr. 25, 1997

[51] Int. Cl.$^6$ .................................. A63J 1/02; E04H 3/24
[52] U.S. Cl. .............................. 52/8; 52/6; 52/7; 352/43; 352/88; 352/89; 472/60; 472/61
[58] Field of Search ...................... 52/6, 8, 7; 348/218; 352/43, 61, 88, 89; 353/10; 359/451, 459; 472/60, 61

[56] References Cited

U.S. PATENT DOCUMENTS

| | | |
|---|---|---|
| 3,101,643 | 8/1963 | McCullough . |
| 3,107,577 | 10/1963 | Adams . |
| 3,118,340 | 1/1964 | Iwerks . |
| 3,237,517 | 3/1966 | Komitor . |
| 3,514,871 | 6/1970 | Tucker . |
| 3,628,829 | 12/1971 | Hellig . |
| 4,509,835 | 4/1985 | Adler . |
| 4,547,050 | 10/1985 | Collender . |
| 4,642,945 | 2/1987 | Browning et al. . |
| 4,885,878 | 12/1989 | Wuu . |
| 4,962,420 | 10/1990 | Judenich . |
| 5,013,147 | 5/1991 | Montes . |
| 5,175,575 | 12/1992 | Gersuk . |
| 5,179,440 | 1/1993 | Loban et al. . |
| 5,414,558 | 5/1995 | You . |
| 5,433,670 | 7/1995 | Trumbull . |
| 5,448,287 | 9/1995 | Hull . |
| 5,502,481 | 3/1996 | Dentinger et al. . |
| 5,673,145 | 9/1997 | Wilson . |

OTHER PUBLICATIONS

Birnbaum's 1997 Special 25th Anniversary Edision Office Guide to Walt Disney World.

pp. 152 and 171 from a book entitled *The American Amusement Park Industry: A History of Technology and Thrills*, by Judith A. Adams, copyright 1991, published by Twayne Publishers, Boston MA.

*Primary Examiner*—Christopher T. Kent
*Attorney, Agent, or Firm*—Lyon & Lyon LLP

[57] ABSTRACT

A theater includes an audience seating area, a stage and at least three projection screens. Multiple film projectors simultaneously project a three dimensional film onto the three projection screens. Three dimensional film elements appear to move seamlessly from one projection screen to the next. In a live action show, actors, stage sets and show action equipment appear to interact with the three dimensional film. The filmed set blends with the stage sets to give dimension and a feeling of depth to the viewing audience. The audience cannot easily distinguish between the real elements and filmed elements thereby intensifying the theater experience.

18 Claims, 5 Drawing Sheets

THEATER WITH MULTIPLE SCREEN THREE DIMENSIONAL FILM PROJECTION SYSTEM

BACKGROUND OF THE INVENTION

The field of the invention is theaters having three dimensional film projection systems.

Three dimensional (3-D) film projection systems are well known in the art. These systems make use of the fact that the left eye and the right eye view an object from slightly different angles. In the brain, these separate perceptions of the two eyes are combined and interpreted in terms of depth. Three dimensional effects are produced in motion pictures by using various systems, most of which involve two projectors that simultaneously project left-eye and right-eye images on the screen. The audience uses binocular viewing filters to perceive the images properly. The binocular viewing filters enable the audience to view two-dimensional images so that they appear to exist in three dimensional space. As a result, images seem to jump off of the screen towards the audience adding to the audience's enjoyment of the film.

The use of multiple film projectors and multiple projection screens for viewing two dimensional (2D) films is known in the art. Generally, the multiple projection screens are used to give the audience a panorama effect. The film for a panoramic cinema is made by multiple independent cameras covering a field of view much greater than that obtained with a single camera. Multiple film projectors are then used (with the number of projectors being equal to the number of independent cameras). Each projector projects a portion of the film onto a separate projection screen. In this manner the audience experiences the illusion that film elements are moving from one screen to the next. Due to the complexities of 3D film, it has previously not been possible to project a 3D film on multiple screens. Accordingly, there remains a need for an improved 3D film theater.

SUMMARY OF THE INVENTION

To these ends, a theater contains an audience seating area and a stage that faces the audience seating area. Projection screens are located in front and on either side of the stage. Preferably, film projectors are located at the back of the theater. The film projectors advantageously each simultaneously project a 3D film onto the three projection screens. While the 3D film is being projected simultaneously onto the three projection screens, a live action show may also take place on the stage and at various other locations in the theater. The live action show most desirably includes live actors, stage sets, show action equipment and special effects, for example, fog effects, special lighting and sound effects. The sets shown in the film advantageously blend with the stage sets to give dimension and the feeling of depth, so that the audience cannot distinguish between the real elements in the live action show and the film elements.

Accordingly, it is an object of the invention to provide an improved 3D film theater.

BRIEF DESCRIPTION OF THE DRAWINGS

In the drawings, wherein similar reference characters denote similar elements throughout the several views.

DETAILED DESCRIPTION OF THE PREFERRED EMBODIMENT

Figure 1:
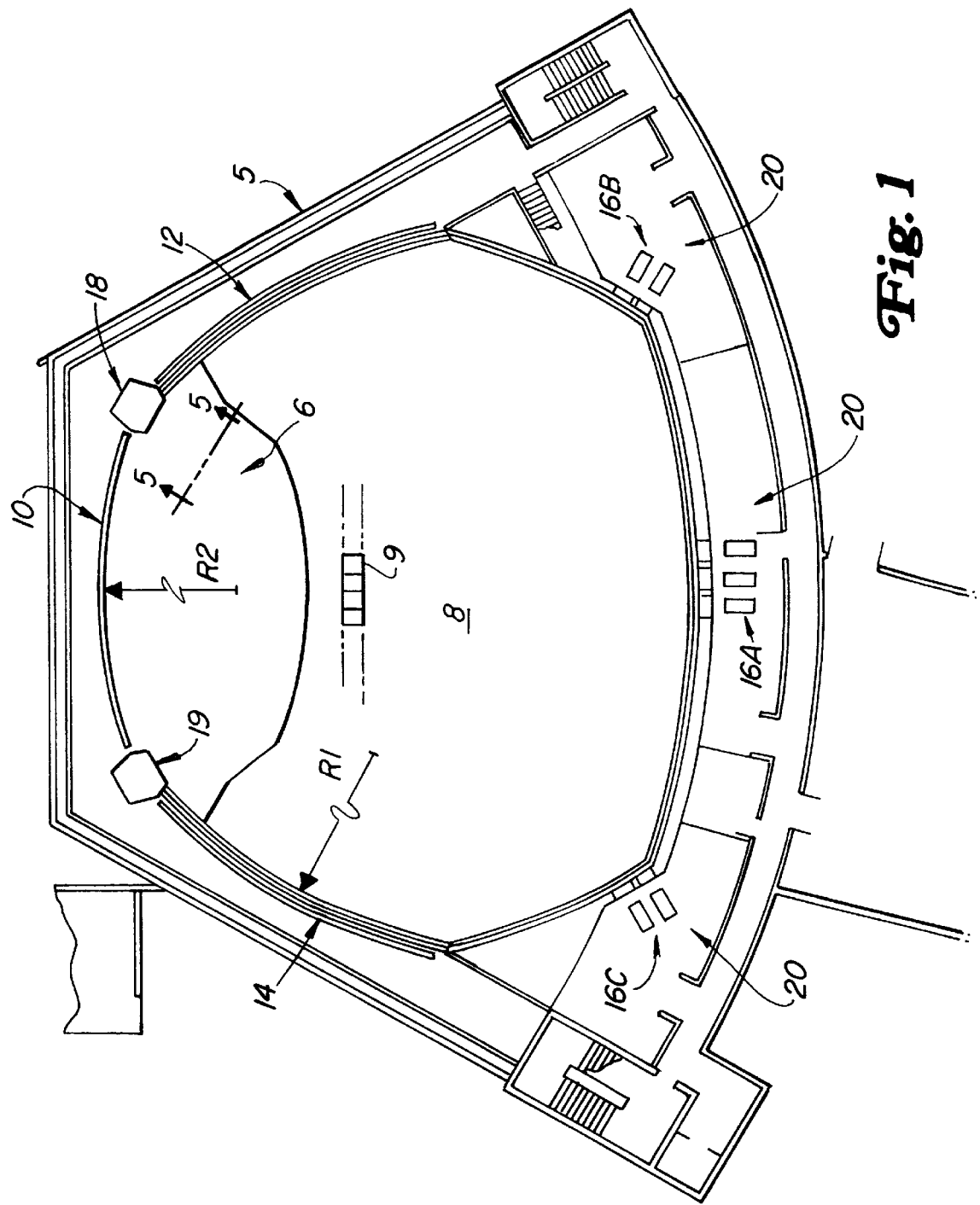
FIG. 1 is a plan view of the theater of the present invention.
Figure 3:
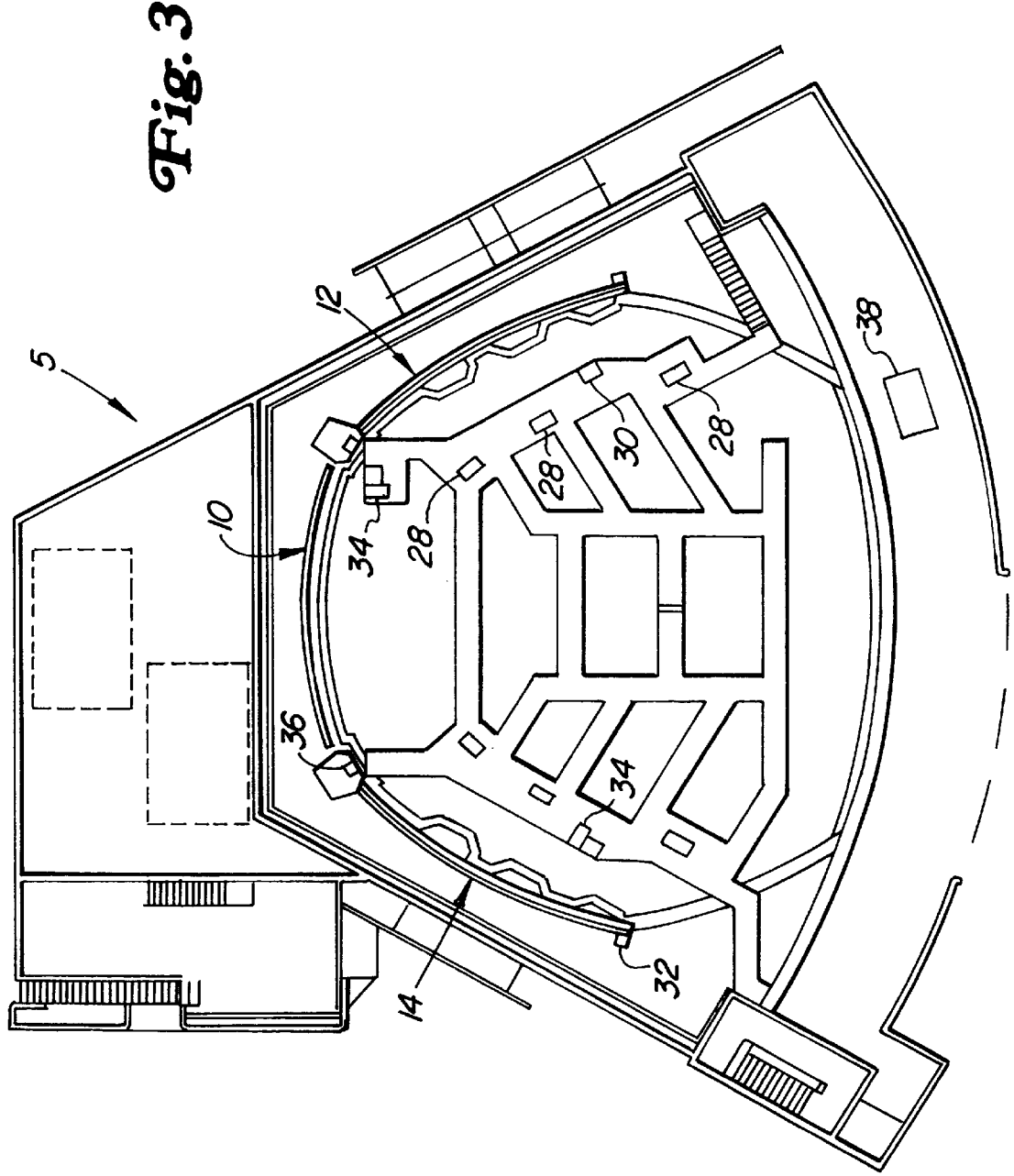
FIG. 3 is a reduced plan view of the theater shown in FIG. 1.

Referring now to the drawings, and initially to FIG. 1 a theater 5 has a stage 6 facing an audience seating area 8 having seats 9. A live action show preferably takes place on the stage 6 as well as in other areas of the theater 5. At the back of the stage 6 is a center projection screen 10, a right projection screen 12, and a left projection screen 14. A three dimensional (3D) film is projected on the projection screens during the live action show. The right and left projection screens (12, 14) are positioned at a angle to the center projection screen 10 as shown in FIG. 3. As shown in FIG. 1, some of the seats are surrounded by the screens on three sides. In the preferred embodiment, the three projection screens are concave, to maximize the 3D effects. The side screens and center screen preferably have a radius of curvature R1 and R2 respectively of about 90–110 feet and 85–100 feet.

Figure 4:
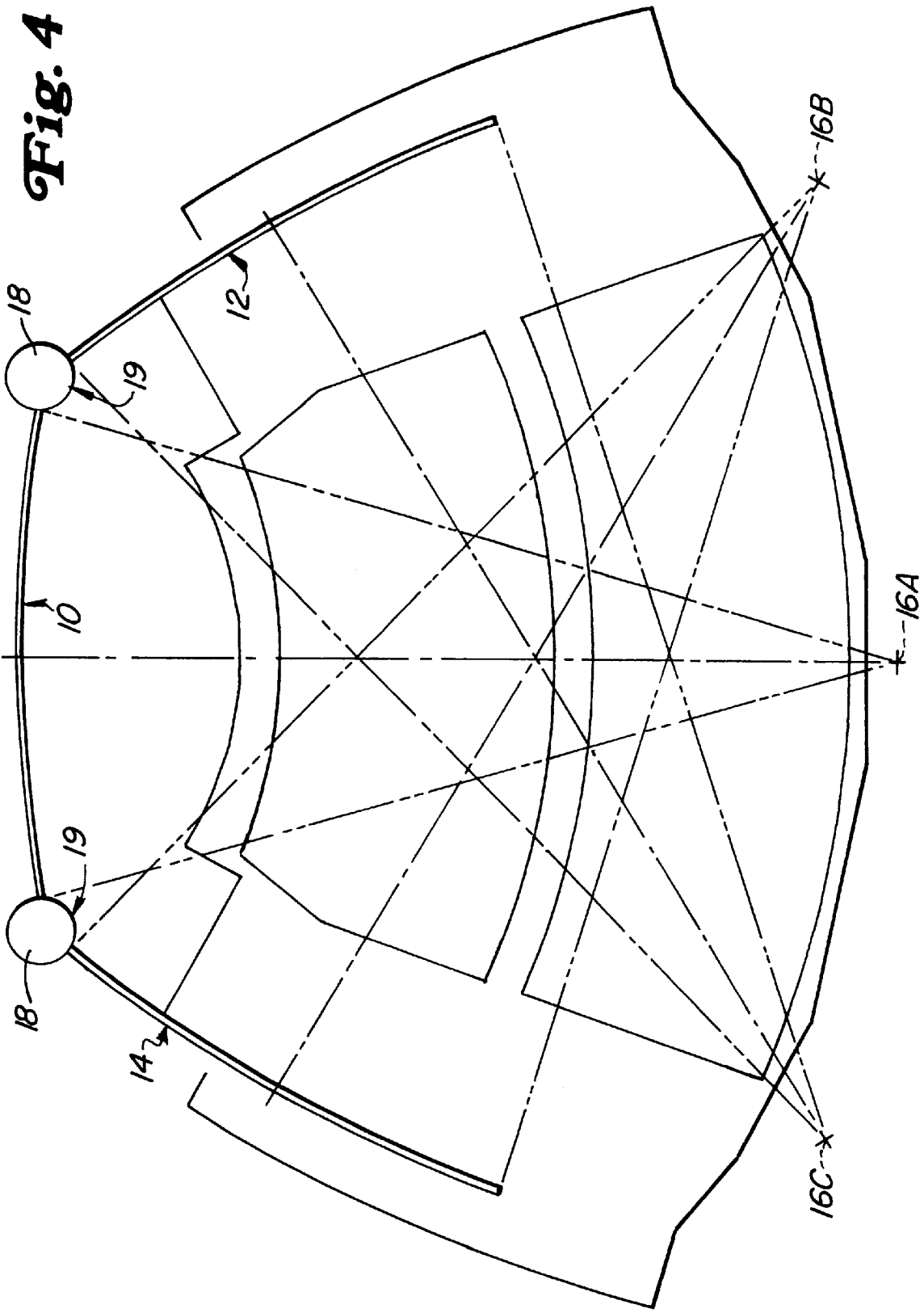
FIG. 4 is a geometric construction showing projection angles.

Theatrical cylinder set pieces 18 are located between the center projection screen 10 and the right projection screen 12 and the left projection screen 14. In back of the theater 5 are three projection rooms 20. In each projection room 20 are multiple film projectors 16A, 16B, 16C. As shown in FIG. 4, film projectors 16A project a portion of the 3D film onto the center projection screen 10. Film projectors 16B project another portion of the 3D film onto the left projection screen 14. Film projectors 16C project a third portion of the 3D film onto the right projection screen 12. The projected images from the center projector 16A may abut or even overlap with the projected images from the side projectors 16B and 16C, on the set pieces 18. In this manner, the 3D film is presented to the audience in panorama. The 3D elements move seamlessly from one screen to the next, making the film more realistic.

Figure 5:
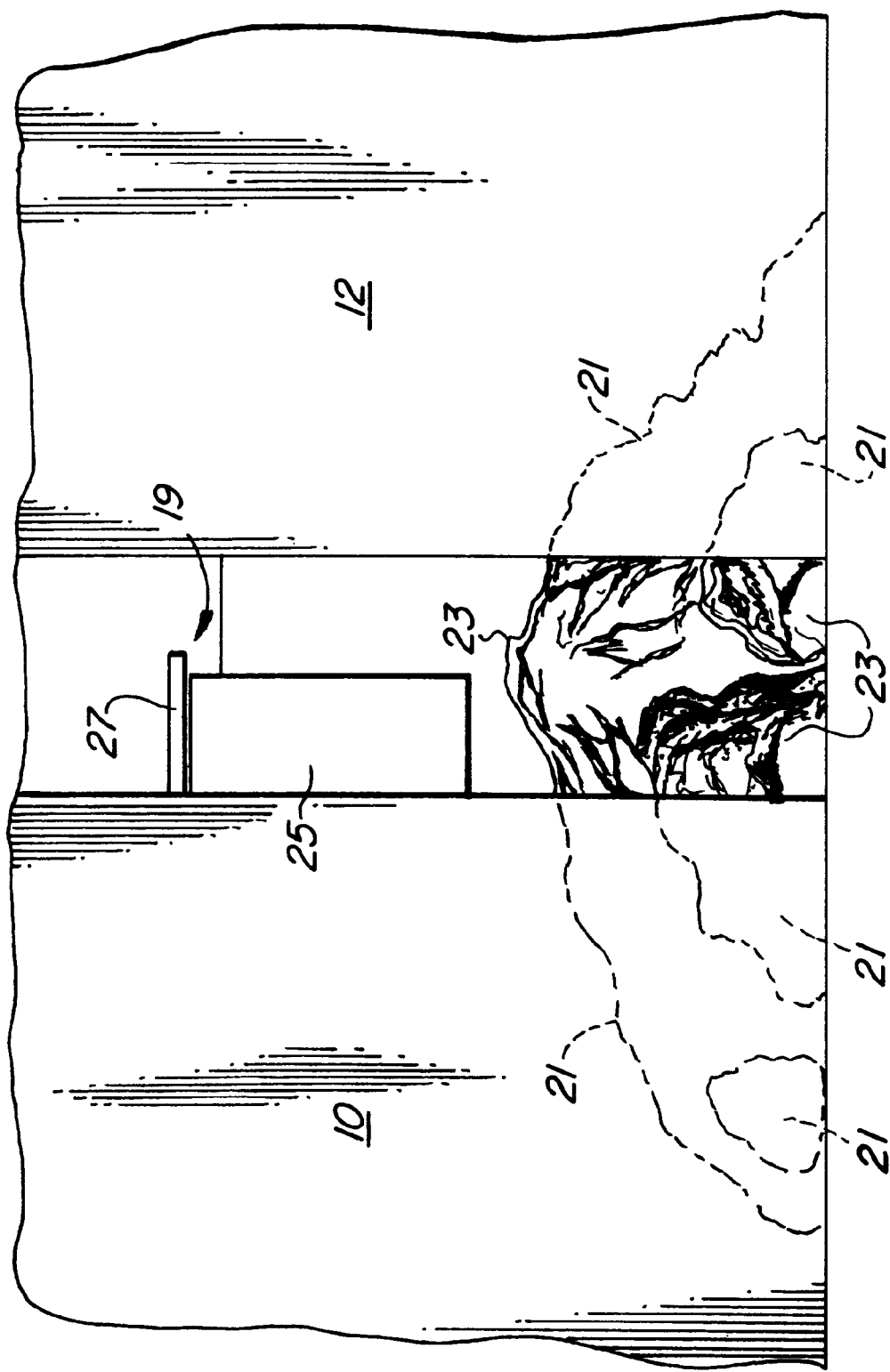
FIG. 5 is a front elevation view taken along line 5—5 of FIG. 1.

The theatrical cylinder set pieces 18 between the screens are designed to match similar elements in the 3D film, adding to the realism. For example, as shown in FIG. 5, if the projected images 21 are images of e.g., a rocky landscape, the front surfaces 19 of the set pieces 18 are provided with 3D props 23 having the appearance of rocks or a rocky landscape. The set matched props 23 help make the transition between the screens more continuous. The props 23 also help to mask any visual aberrations resulting from misalignment of the projected images. The set pieces 18 preferably have panels or surfaces 25 which are moved by actuators 27, to cover and uncover, or move into place, different props 23 or scenery, as may be desired to match the changing scenery in the images projected onto the screens. The actuators are controlled by a show controller 38 (shown in FIG. 3) linked to the projectors, so that the props 23 on the set pieces 18 come into view in proper timing with the projected images.

Figure 2:
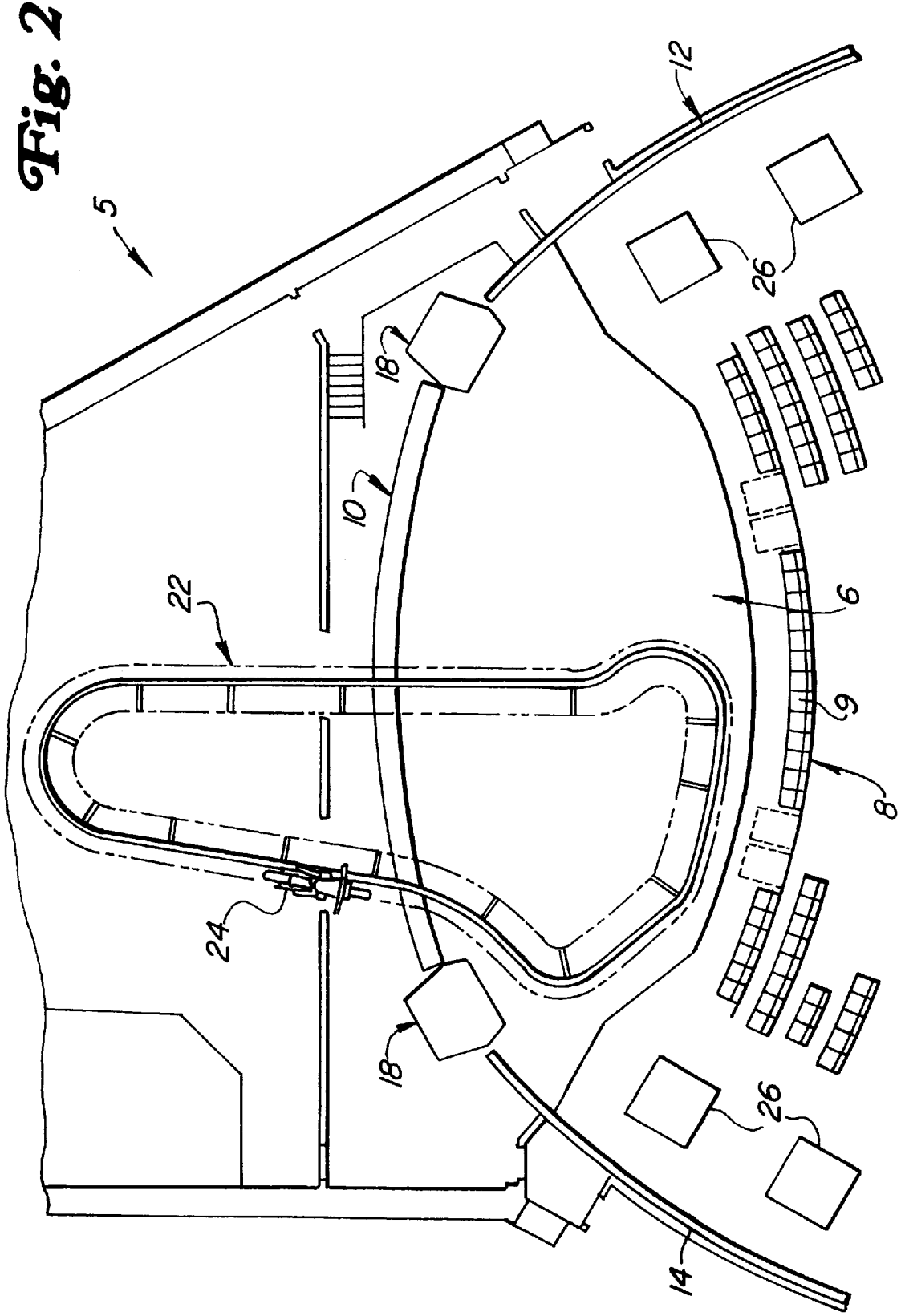
FIG. 2 is an enlarged plan view of the front area of the theater.

Referring now to FIGS. 2 and 3, the theater 5 also contains show action equipment used in the live action show and in conjunction with the 3D film presentation. In the preferred embodiment, the show action equipment includes a motorcycle 24 which rides on a track 22 in the stage 6. The show action equipment also includes robots 26 which are situated on platforms on either side of the audience seating area 8 and which shoot simulated guns at retractable targets 28. In the preferred embodiment, actors use a platform 30 as a repelling point during the live action show. Special effects, including fog generators 32, 34 and 36, are also used to enhance the live action show and 3D film presentation. A show controller 38 controls the show action equipment and special effects, synchronized with the projectors and set piece props.

While the invention is susceptible to various modifications and alternative forms, specific examples have been shown in the drawings and are described in detail. It should be understood, however, that the invention is not limited to the particular forms or methods disclosed. Rather, the invention is intended to cover all modifications, equivalents and alternatives falling within the spirit and scope of the claims.

What is claimed is:

1. A 3D film theater comprising:
   a left screen, a center screen, and a right screen in the theater, the left screen being spaced apart from the center screen and the center screen being spaced apart from the right screen;
   first, second, and third film projectors positioned in the theater to simultaneously project film images onto the left, center and right screens, respectively, with the film images including a scenic element;
   a first set piece adjoining the left screen and the center screen, and a second set piece adjoining the center screen and the right screen; and
   at least one three dimensional scenic element on each of the first and second set pieces to make the transitions between the screens more continuous and to mask visual aberrations from misalignment of the projected images.

2. The theater of claim 1 further comprising at least one of a stage for supporting live actors, show action equipment and special effects positioned between at least one of the screens and the projectors.

3. The theater of claim 1, wherein the screens are concave.

4. The theater of claim 1 further comprising multiple props on the set pieces, and means for concealing and exposing the props.

5. The theater of claim 1 wherein the projectors project images in straight lines directly onto the screens.

6. The theater of claim 1 further comprising a multiplicity of seats positioned between the screens and the projectors, with at least some of the seats surrounded by the screens on three sides.

7. A theater comprising:
   a first fixed screen;
   a second fixed screen;
   a set piece fixed between the first screen and the second screen;
   a first three dimensional prop on the set piece;
   a second three dimensional prop on the set piece; and
   means for exposing and concealing the first and second props.

8. The theater of claim 7 further comprising a projector and show controller linked to the projector and to the means for exposing and concealing.

9. The theatre of claim 7 wherein the means for exposing and concealing comprises a panel supported by an actuator.

10. The theatre of claim 7 wherein the means for exposing and concealing comprises an actuator linked to at least one of the first and second props.

11. A screen for a theater comprising:
    a first screen section;
    a set piece;
    a second screen section adjoining the set piece;
    a three dimensional theatrical prop on the set piece; and
    an actuator for exposing and concealing the theatrical prop.

12. A 3D film theater comprising:
    a first screen in the theater;
    a second screen in the theater, the second screen spaced apart from the first screen;
    a set piece linking the first screen to the second screen, the set piece substantially aligned with the first screen and the second screen;
    a three dimensional theatrical prop on the set piece; and
    means for exposing and concealing the theatrical prop.

13. The theater of claim 12 further comprising first and second film projectors positioned in the theater to simultaneously project film images onto the first and second screens, respectively, with the film images including a scenic element.

14. The theater of claim 13, wherein the theatrical prop includes a scenic element.

15. The theater of claim 13 further comprising a projector and show controller linked to the projector and to the means for exposing and concealing.

16. The theater of claim 12 further comprising first and second film projectors positioned in the theater to simultaneously project film images onto the first and second screens, respectively, the theatrical prop adapted to help make the transitions between the screens more continuous and to mask any visual aberrations from misalignment of the projected images.

17. The theater of claim 12, wherein the means for exposing and concealing comprises an actuator linked to the theatrical prop.

18. The theater of claim 17, wherein the means for exposing and concealing comprises a panel supported by the actuator.

* * * * *